United States Patent [19]
Carnarius et al.

[11] Patent Number: 4,952,290
[45] Date of Patent: Aug. 28, 1990

[54] WASTE WATER TREATMENT AND RECOVERY SYSTEM

[75] Inventors: Michael E. Carnarius, Camp Hill; Srinivasan V. Sarma, Hummelstown, both of Pa.

[73] Assignee: AMP Incorporated, Harrisburg, Pa.

[21] Appl. No.: 324,774

[22] Filed: Mar. 16, 1989

[51] Int. Cl.$^5$ ............................................. C02F 1/04
[52] U.S. Cl. ................... 204/149; 204/237; 204/241; 204/DIG. 13; 204/239
[58] Field of Search ............... 204/149, DIG. 13, 241, 204/237, 239

[56] References Cited

U.S. PATENT DOCUMENTS

| | | |
|---|---|---|
| 2,773,029 | 12/1956 | Sebald . |
| 2,984,081 | 3/1958 | Hahn . |
| 3,146,167 | 8/1964 | Berardi . |
| 3,616,437 | 10/1971 | Yagishita . |
| 3,637,467 | 1/1972 | Spatz . |
| 4,157,942 | 6/1979 | Tuznik ..................... 204/DIG. 13 X |
| 4,171,255 | 10/1979 | Tuznik et al. ........................ 204/238 |
| 4,197,167 | 4/1980 | Wright, Jr. . |
| 4,613,412 | 9/1986 | MacDermid ............... 204/DIG. 13 |
| 4,781,806 | 11/1988 | Tenace et al. . |
| 4,790,904 | 12/1988 | Yates ................................ 204/241 X |

*Primary Examiner*—Donald R. Valentine
*Attorney, Agent, or Firm*—William B. Noll

[57] ABSTRACT

This invention relates primarily to a waste water treatment and recycling system for an electroplating line. Electroplating lines typically produce waste products which may be defined as environmentally hazardous. The present invention provides for a system of complete recycling of such wastes from an electroplating line which includes (I) a plurality of treatment stations, where each station consists of a treatment tank and a rinse tank, and (II) means for sequentially moving metallic parts for treatment therein from a treatment tank and a rinse tank of a first treatment station, to a treatment tank and rinse tank of a second treatment station. Characteristic features of the waste water treatment and recovery system include the steps of (a) collecting and transferring overflow solution from each rinse tank to a vacuum chamber, where the overflow solution contains chemical constituents from its prior treatment tank,
(b) vaporizing the overflow solution,
(c) condensing the vapors thereof and storing the condensate for return to the several treatment stations,
(d) collecting the chemical constituents as a residue of said overflow solution, and
(e) retaining the residue until a predetermined concentration of the chemical constituents is achieved, and transferring the residue to its corresponding treatment tank, whereby the electroplating system is fully recyclable without creating waste product.

3 Claims, 2 Drawing Sheets

WASTE WATER TREATMENT AND RECOVERY SYSTEM

BACKGROUND OF THE INVENTION

The present invention is directed primarily to a waste water treatment and recycling system for an electroplating line.

In an electroplating system, the object thereof is to deposit a thin coating of some metal, through electrolytic deposition, onto a substrate. Such a system may include a number of stations, such as cleaning, etching, and multi-layer coating by sequential plating. Since each such station involves the chemical treating of the substrate, whether by batch or continuous treating, a rinse tank follows each chemical treatment to minimize contamination of a subsequent station. Because of solution dragout, each rinse tank in time becomes increasingly contaminated itself. This is particularly critical in the metal plating stations where the contaminants are considered toxic wastes. Present state and federal laws impose severe restrictions on the handling and disposal of such wastes.

A simple system includes a cleaning station to remove such soils as buffing compounds, stamping or cutting lubricants and the like; and acid station dip to remove metal oxides, often called pickling; and finally, electroplating station(s) with one or more metals, such as nickel and gold. The latter combination is particularly suitable in the manufacture of electrical terminals. Gold, for example, is characterized by good electrical conductivity and little or no formation of oxides that can reduce conductivity.

The metal plating step(s) may include, by way of example, immersion of the electrical terminal substrate into a solution (plating bath) of the salt of the metal substrate which is to be plated and is employed as the cathode, or by passing the product, such as part of a continuous strip, over the metal plating bath where the solution thereof is pumped up to engulf, i.e. achieve a fountain effect, then return to the plating tank. The anode of the system may be of the same metal which is to be coated or may be a conductor which is chemically unaffected by the electroplating reaction, A low-voltage current is then passed through the solution, electrolyzing and plating the cathodic substrate with the metal in the solution. When the coating on the object is of the desired thickness, the substrate is removed and passed to a rinse tank where the residual plating solution is removed from the plated objects, such as by the aid of air knives critically disposed at the exit end of such tank. Actually, the use of air knives is well known, and may typically be found at each tank of the plating system to minimize dragout therefrom.

After a period of operation, it will be understood that contaminates are being dragged out of the plating solution into such rinse tank, resulting in a buildup therein of contaminants. It is important to maintain the rinse solution below a certain level of concentration in order to maintain an effective rinse operation and to prevent spotting or other deterioration in the quality of the plated substrate. While fresh water can be added to the rinse tank to dilute and maintain an appropriate contaminant level, problems of disposal arise on the solution withdrawn from the tank.

Various proposals have been offered by the prior art for treating the waste rinse water in plating systems. Such prior art systems include U.S. Pat. No. 4,781,806 to Tenace, wherein there is taught a system in which water use efficiency is achieved by means of limited use of overhead water sprays, multiple rinse tank backflow to the prior process tank and water evaporation from said process tanks. In addition, all waste water not returned to the prior process tank locally at each plating subassembly is transferred to an in-plant sump for common evaporative treatment.

Other prior art systems are disclosed in U.S. Pat. No. 3,616,437 to Yagishita, and U.S. Pat. No. 3,637,467 to Spatz. The former system is directed to a system for reclaiming plating wastes wherein a liquid rinse water is brought into a tower where it is heated by steam in order to partially vaporize it. The vapor is then passed to an ejector where it is introduced into cooling water to be condensed and then brought to a reservoir.

Spatz, the latter development, relates to a metal reclamation process and system which uses a primary rinse tank and a secondary rinse tank. Liquid is drawn off through a conduit and passed to a pump where it is brought into a reverse osmosis unit, the concentrate of which passes back to the plating tank and wherein permeate is brought through a conduit back to the primary rinse tank.

The present invention, in contrast to the above, teaches a simple system which is fully recyclable, that is, does not create any waste product.

SUMMARY OF THE INVENTION

This invention relates to an electroplating line, and more particularly to the feature of treating and recovering the waste water thereof. Such a line typically includes (I) a plurality of treatment stations, where each station consists of a treatment tank and a rinse tank, and (II) means for sequentially moving metallic parts for treatment therein from a treatment tank and a rinse tank of a first treatment station, to a treatment tank and rinse tank of a second treatment station. Characteristic features of the waste water treatment and recovery system include the steps of (a) collecting and transferring overflow solution from each rinse tank to a vacuum chamber, where the overflow solution contains chemical constituents from its prior treatment tank, (b) vaporizing the overflow solution, (c) condensing the vapors thereof and storing the condensate for return to the several treatment stations, (d) collecting the chemical constituents as a residue of said overflow solution, and (e) retaining the residue until a predetermined concentration of the chemical constituents is achieved, and transferring the residue to its corresponding treatment tank, whereby the electroplating system is fully recyclable without creating waste product.

DETAILED DESCRIPTION OF PREFERRED EMBODIMENT

The present invention is directed to an electroplating system consisting of a plating line and an integrated water reuse and recovery system, where an object thereof is to eliminate waste disposal altogether. The system consists of a low temperature vaporization process in which the rinse water from the first stage of a cascade rinse system is introduced or transferred into a vacuum chamber. With the use of a high degree of vacuum therein, the water can be made to evaporate at a very low temperature, where as explained hereinafter, can come from the system itself. The water vapors from the chamber travel to another chamber where they pass over cooling coils. The vapor condenses in this chamber and the condensate is collected as deionized or distilled water into another chamber. This collected water is pumped back to the plating line for reuse, as needed. Concurrent with the evaporation, this allows the chemical constituents that were present at low concentrations in the rinse water to accumulate as the water is being evaporated. As the concentration of the chemical constituents in the evaporated chamber builds up to bath strength, the solution from the evaporator chamber is pumped out to the appropriate processing tanks on the plating line for reuse.

Figure 1:
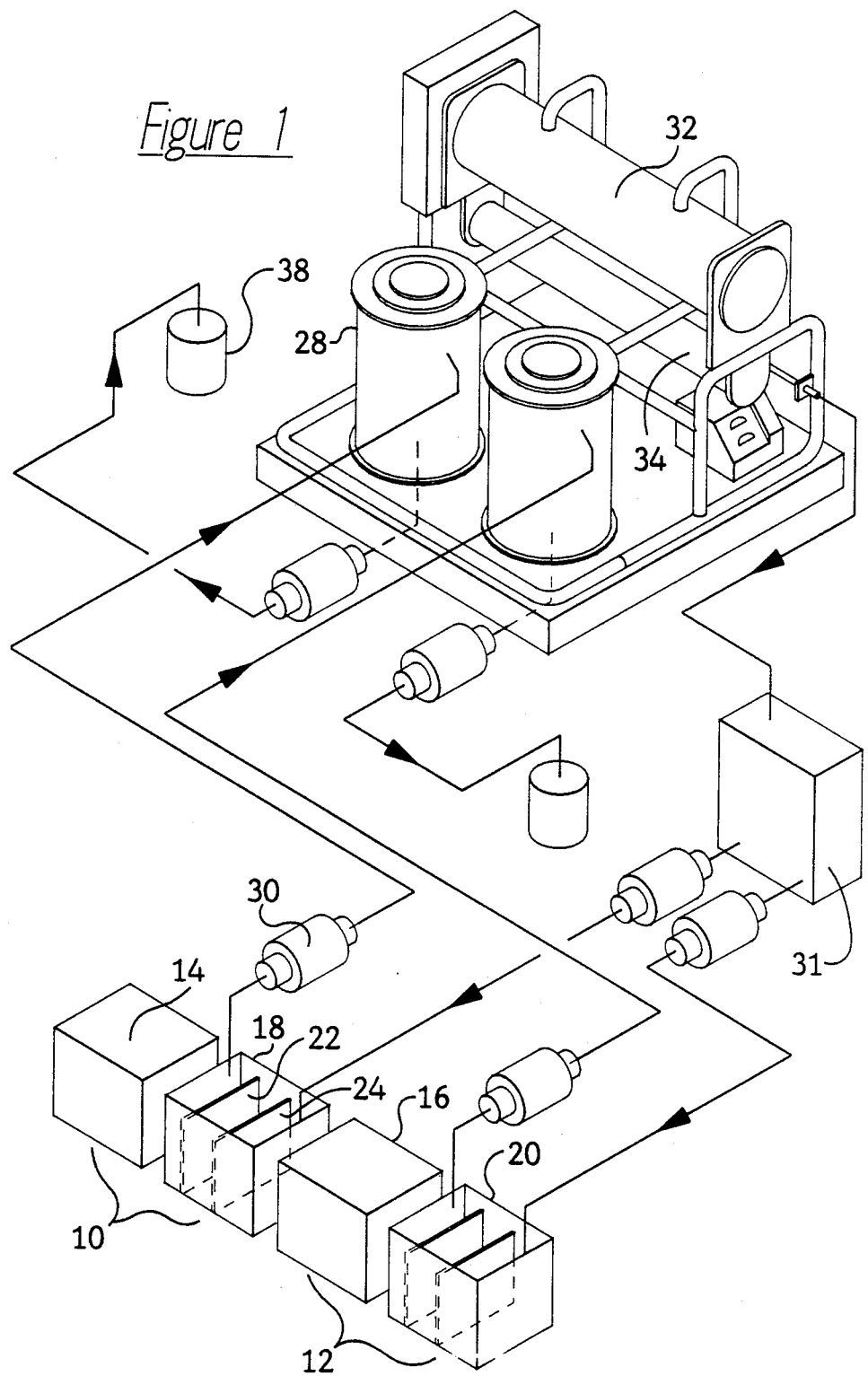
FIG. 1 is a schematic representation of an exemplary electroplating method including the waste water treatment and recovery system of this invention.

The exemplary features, as noted above, will be better understood with reference to FIG. 1. While the invention hereof contemplates a plurality of product treatment stations, such as cleaning, etching, and multiple layer or selective plating, only two such stations are illustrated therein.

As shown in FIG. 1, each treatment station 10,12 consists of a treatment tank 14,16, each of which is followed by a rinse tank 18,20. It will be understood, from this illustration, that the substrate to be treated moves progressively and in sequence through or above the tanks 14-18-16-20. Typically, the initial tank within a station is a chemical treatment such as electrocleaning, acid etching, or metal plating. The second tank, or plural tanks if desired, contains an aqueous rinse solution. It is not uncommon to provide for multiple, typically three, subcompartments within a rinse tank where the overflow from a first subcompartment flows into the adjacent downstream subcompartment. This is what may be termed a cascade rinse system. In any case, the obvious purpose of the rinse is to remove as much chemical residue that may be present on the substrate to be plated from entering into and contaminating the downstream treatment tank. Thus, by virtue of a cascade rinse system, the initial subcompartment may be significantly more contaminated than the final subcompartment, and could typically contain high amounts of metal ions.

The rinse tank, as preferred herein, comprises a cascade system. That is, the tank 18 for example, is provided with at least one partition 22, defining a primary rinse chamber 24, and an overflow chamber 26. The rinsing solution cascades over the partition 22 from the rinse chamber 24 into the overflow chamber 26 where excess solution is drawn to the vacuum chamber 28. The vacuum created therein is normally sufficient to draw the rinse solution to the chamber, however, a backup system, such as pump 30, may be incorporated into the line. In either case, as needed, typically at about the rate of removal therefrom, fresh or deionized water from the system, as described later, may be pumped to a holding tank 31, for later transfer, or directly returned to the rinse chamber. The purpose of the fresh water is to dilute the rinse solution and prevent buildup of constituents therein that could affect the surface quality of the substrate treated therein, and to maintain the level thereof in the tank. Each rinse tank of the plating system is operated in a similar manner.

Since the rinse overflow may likely contain constituents which are environmentally harmful, i.e. toxic, the present invention contemplates a closed loop system, or one which totally recycles such rinse overflow to avoid impacting on the environment. Accordingly, such overflow is transferred to a vacuum chamber 28. The vacuum chamber 28, as contemplated herein, is a vapor compression heat pump evaporator of the type manufactured by Calfran International, Inc. of Springfield, Mass., under the model designations: PTU-600, -450, and -300. The operation thereof is low temperature evaporation conducted at 50°–70° F. under a vacuum of 4–10 mm of Hg.

Figure 2:
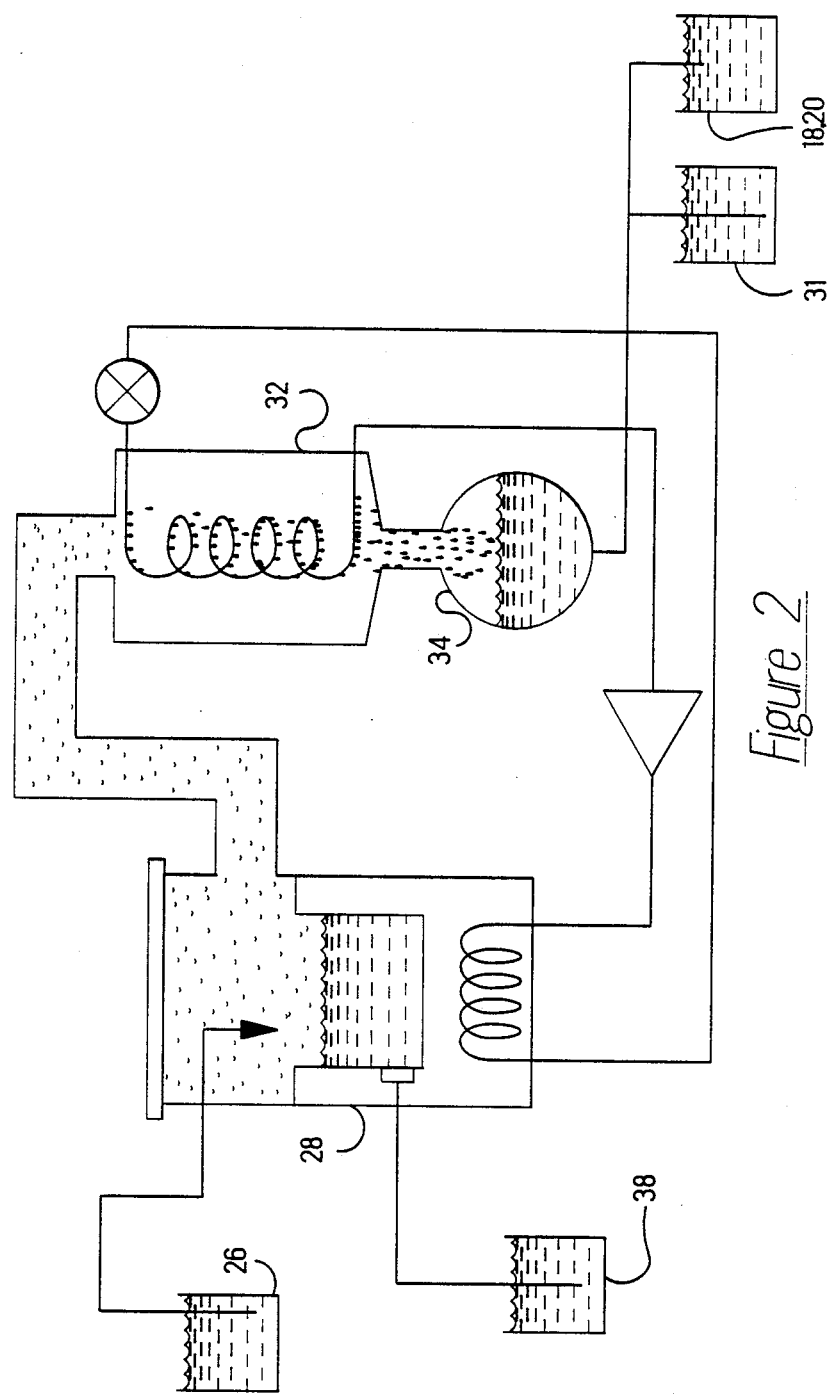
FIG. 2 is a simplified schematic representation on the operation of a vapor compression heat pump evaporator as used herein.

In any case, as illustrated in FIG. 2, the water vapors from the vacuum chamber 28 are transferred to a condensation chamber 32 where they pass over cooling coils to be condensed and collected in a reservoir 34 as deionized or distilled water. From such reservoir 34, the fresh water may be returned directly to the plating line rinse tanks 18,20, or to a holding tank 31 for use as needed.

It will be appreciated that as the vacuum chamber 28 operates to vaporize the water of the rinse solution, this allows the chemical constituents that are present initially at low concentrations to accumulate as the water is evaporated. As the concentration of such constituents buildup to some predetermined level, the vacuum chamber 28 may be pumped out continuously at steady state to transfer the concentrate directly to the appropriate plating line treatment tank, or to an intermediate holding tank 38 for later use. By this practice, the chemical treatment solution can be maintained at the desired level of concentration. Like the treatment of the rinse solution, no waste product is created for which disposal is required.

In the operation of the closed loop system of this invention, it will be appreciated that the plating parameters and the capacity of the system components can vary greatly depending on a variety of factors. For example, as known in the art, the parameters for metal plating are based on Faraday's laws, namely, grams of metal deposit per (amperage to drive ions times time). Such factors include:
(a) plating rate, g/amp-sec (measured as efficiency as compared to theoretical 100% efficiency)
(b) dwell time
(c) conductivity of solution
(d) conductivity of electrical connection
(e) solution flow velocity (minimize cathode diffusion layer)
(f) geometry of product
(g) concentration, pH, temp. of solution
(h) cell design (incl. cathode & anode shielding techniques).

By first establishing the plating parameters, including product rates, or line speeds, it is possible to then establish capacity rates for the system components. The flow rate of the overflow water from the rinse tanks is proportional to the evaporation rate plus concentrate removal rate from a given vacuum chamber.

A typical plating line for the production of plated electrical contacts, including one or more rinse tanks per station, may consist of inline stations, such as:
(a) caustic degreasing,
(b) caustic, hot electro-cleaning, to cathodically scrub the product, (c) acid, activation or pickling,
(d) electrolytic Ni plating, such as with a solution of nickel sulamate-nickel bromide, and
(e) duplex plating, such as by selective plating by Au followed by selective plating by SnPb.

Since electroplating lines, including the various product cleaning stations, are well known in the art, no attempt nor need will be made to select typical line parameters. Such selections are well within the skill of the practioners in this art.

We claim:

1. A method of operating an electroplating system by fully recovering and recycling rinse solutions, which method includes a plurality of treatment stations, where each station comprises a treatment tank and a rinse tank, and means for sequentially moving metallic parts for treatment therein from a treatment tank and a rinse tank of a first treatment station, to a treatment tank and rinse tank of a second treatment station, said method comprising the steps of
    (a) collecting and transferring overflow solution from each said rinse tank to a vacuum chamber, where said overflow treatment tank, and said overflow solutions are isolated from other overflow solutions within said vacuum chamber,
    (b) vaporizing said overflow solution,
    (c) condensing the vapors thereof and storing or directly transferring the condensate to said treatment stations,
    (d) collecting said chemical constituents as a residue of said overflow solution, and
    (e) retaining said residue until a predetermined concentration of said chemical constituents is achieved, and transferring said residue to its corresponding treatment tank, whereby the electroplating system is fully recyclable without creating waste product.

2. The method of operating an electroplating system according to claim 1, wherein said vacuum chamber is operated under conditions which allow for low temperature evaporation of said overflow solution.

3. The method of operating an electroplating system according to claim 2, wherein said vacuum chamber is operated under a pressure of from 4–10 mm of Hg.

* * * * *